(12) United States Patent
Sugawara

(10) Patent No.: US 11,126,604 B2
(45) Date of Patent: Sep. 21, 2021

(54) AGGREGATION APPARATUS, AGGREGATION METHOD, AND STORAGE MEDIUM

(71) Applicant: FUJITSU LIMITED, Kanagawa (JP)

(72) Inventor: Hisashi Sugawara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 16/293,450

(22) Filed: Mar. 5, 2019

(65) Prior Publication Data
US 2019/0205292 A1    Jul. 4, 2019

Related U.S. Application Data

(63) Continuation of application No. PCT/JP2016/080138, filed on Oct. 11, 2016.

(51) Int. Cl.
*G06F 16/22* (2019.01)
*G06F 16/2455* (2019.01)
(Continued)

(52) U.S. Cl.
CPC ...... *G06F 16/2255* (2019.01); *G06F 16/1865* (2019.01); *G06F 16/196* (2019.01);
(Continued)

(58) Field of Classification Search
CPC ............. G06F 16/2255; G06F 16/2272; G06F 16/1865
See application file for complete search history.

(56) References Cited

U.S. PATENT DOCUMENTS

2006/0288045 A1*  12/2006  Raz .................... G06F 16/284
2011/0264663 A1   10/2011  Verkasalo
(Continued)

FOREIGN PATENT DOCUMENTS

JP        8-44606       2/1996
JP        2001-43279    2/2001
(Continued)

OTHER PUBLICATIONS

International Search Report attached with the Written Opinion of the International Searching Authority, mailed in connection with PCT/JP2018/080138 and dated Dec. 6, 2016, with partial English translation (8 pages).

*Primary Examiner* — Loc Tran
(74) *Attorney, Agent, or Firm* — Fujitsu Patent Center

(57) ABSTRACT

A non-transitory computer-readable storage medium storing a program that causes a computer to execute a process, the program aggregating data of an aggregation target table including at least one external tables relating to data other than data managed by the computer, includes executing processing of associating a specific item other than a date item as an aggregation unit of the external table having a plurality of items including the date item with an aggregate value list in which an aggregate value is stored in a unit of date item of predetermined granularity for each of the specific items on a one-to-one basis such that the aggregate value list of the specific item is specified by using the specific item as an index, and updating the aggregate value of the aggregate value list specified by using the specific item as the index when data stored in the external table is aggregated.

10 Claims, 17 Drawing Sheets

(51) Int. Cl.
  *G06F 16/18* (2019.01)
  *G06F 16/188* (2019.01)
  *G06F 16/2453* (2019.01)

(52) U.S. Cl.
  CPC ...... *G06F 16/2272* (2019.01); *G06F 16/2453* (2019.01); *G06F 16/2455* (2019.01)

(56) References Cited

U.S. PATENT DOCUMENTS

2012/0109975 A1    5/2012   Takahashi
2015/0120739 A1*   4/2015   Hosokawa .............. G06F 16/22
                                                        707/740

FOREIGN PATENT DOCUMENTS

| JP | 2002-259384 | 9/2002 |
| JP | 2006-195680 | 7/2006 |
| JP | 2012-93976  | 5/2012 |
| JP | 2012-526314 | 10/2012 |

* cited by examiner

FIG. 4

| SALE DATE | SALE SHOP | SALE MERCHANDISE | SALE AMOUNT | ... |
|---|---|---|---|---|
| 20150526 | TOKYO | APPLE | 50 | ... |
| 20150526 | TOKYO | TANGERINE | 20 | ... |
| 20150526 | YOKOHAMA | APPLE | 10 | ... |
| ... | ... | ... | ... | ... |

| DATE | SHOP | MERCHANDISE | AMOUNT | ... |
|---|---|---|---|---|
| 20150526 | TOKYO | APPLE | 30 | ... |
| 20150526 | TOKYO | TANGERINE | 50 | ... |
| 20150526 | YOKOHAMA | TANGERINE | 20 | ... |
| ... | ... | ... | ... | ... |

| PARAMETER NAME | VALUE | | |
|---|---|---|---|
| AGGREGATION TARGET TABLE | SALE_inner | SALEA_outer | ... |
| DIMENSION COLUMN 1 | SALE SHOP | SHOP | ... |
| DIMENSION COLUMN 2 | SALE MERCHANDISE | MERCHANDISE | ... |
| DIMENSION COLUMN 3 | NULL | NULL | ... |
| ... | ... | ... | ... |
| DIMENSION COLUMN N | NULL | NULL | ... |
| MAJOR | SALE AMOUNT | SALE | ... |
| DATE COLUMN | SALE DATE | DATE | ... |
| DATE AGGREGTION UNIT | "MONTH" | | |
| AGGREGATION METHOD | SUM | | |
| ... | ... | | |

FIG. 7

| ROUNDING DATE | dim1 | dim2 | AGGREGATE VALUE | PARAMETER | ... |
|---|---|---|---|---|---|
| 201505 | TOKYO | APPLE | 500 | 10 | ... |
| 201506 | TOKYO | TANGERINE | 200 | 7 | ... |
| 201507 | YOKOHAMA | APPLE | 100 | 9 | ... |
| ... | ... | ... | ... | ... | ... |

FIG. 9

| MINIMUM ROUNDING DATE | 201505 |
|---|---|
| MAXIMUM ROUNDING DATE | 201512 |

52

AGGREGATION APPARATUS, AGGREGATION METHOD, AND STORAGE MEDIUM

CROSS-REFERENCE TO RELATED APPLICATION

This application is a continuation application of International Application PCT/JP2016/080138 filed on Oct. 11, 2016 and designated the U.S., the entire contents of which are incorporated herein by reference.

FIELD

The embodiment discussed herein is related to an aggregation apparatus, an aggregation method, and a storage medium.

BACKGROUND

In the related art, there is known a technique of taking in data including a plurality of items and aggregating for each item.

Japanese Laid-open Patent Publication No. 2006-195680 and Japanese National Publication of International Patent Application No. 2012-526314 discuss a technique of loading data while executing processing such as aggregation processing on the data when the data accumulated on outside such as a data warehouse is loaded.

In recent years, in order to analyze data, data stored in a table included in each of a plurality of databases is aggregated. In this aggregation, it is conceivable to take one database among a plurality of databases as an execution target database of aggregation processing and perform aggregation processing of aggregating data stored in a table of each database, for example. In the following, a table relating to data managed by a computer, for example, a table in which database to be executed itself stores data will be referred to as an "internal table".

In this case, a table of a database, among a plurality of databases, other than the database on which aggregation processing is to be executed is virtualized into a table of a database on which aggregation processing is to be executed and aggregation processing is performed on the virtualized table, for example. In the following, a table relating to data other than the data managed by a computer is referred to as an "external table". For example, an external table is obtained by a table of a database other than the database on which aggregation processing is to be executed being virtualized into a table of a database on which aggregation processing is to be executed.

For an internal table, it is possible to speed up aggregation processing of data by assigning an index such as a B tree index or the like to a column as an aggregation unit like a date by a function of a system that manages a database on which an aggregation processing is to be executed.

Contrary to this, for an external table, since it is not possible to assign an index by a function of a system that manages a database on which the aggregation processing is to be executed, aggregation processing of data becomes relatively slow. On the other hand, by loading a table of a database other than the database on which aggregation processing is to be executed into a database on which aggregation processing is to be executed and turning the table into an internal table, it is possible to assign an index to the table. However, this load processing takes a relatively long time and the whole processing of adding the aggregation processing to the load processing becomes relatively slow. In view of the above, it is desirable to be able to aggregate data stored in an external table at a high speed.

SUMMARY

According to an aspect of the embodiments, a non-transitory computer-readable storage medium storing a program that causes a computer to execute a process, the program aggregating data of an aggregation target table including at least one external tables relating to data other than data managed by the computer, the process includes executing processing of associating a specific item other than a date item as an aggregation unit of the external table having a plurality of items including the date item with an aggregate value list in which an aggregate value is stored in a unit of date item of predetermined granularity for each of the specific items on a one-to-one basis such that the aggregate value list of the specific item is specified by using the specific item as an index, and updating the aggregate value of the aggregate value list specified by using the specific item as the index when data stored in the external table is aggregated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of an internal table;

FIG. 5 is a diagram illustrating an example of the external table;

FIG. 6 is a diagram illustrating an example of an aggregation definition;

FIG. 7 is a diagram illustrating an example of an internal aggregation table;

FIG. 9 is a diagram illustrating an example of metadata;

DESCRIPTION OF EMBODIMENTS

An example of an embodiment of the embodiment will be described in detail with reference to the drawings in the following.

Before details of the embodiment are described, problems of aggregation processing of data stored in an external table will be described. To avoid a complication, a case where items (rows) of data stored in an internal table and an external table are the same and the aggregation processing is performed on the data stored in the external table after the aggregation processing is performed on the data stored in the internal table will be described. In the following, among a plurality of databases (DB), the database on which the aggregation processing is to be executed is referred to as an "internal DB" and the database other than the internal DB is referred to as an "external DB".

Figure 1:
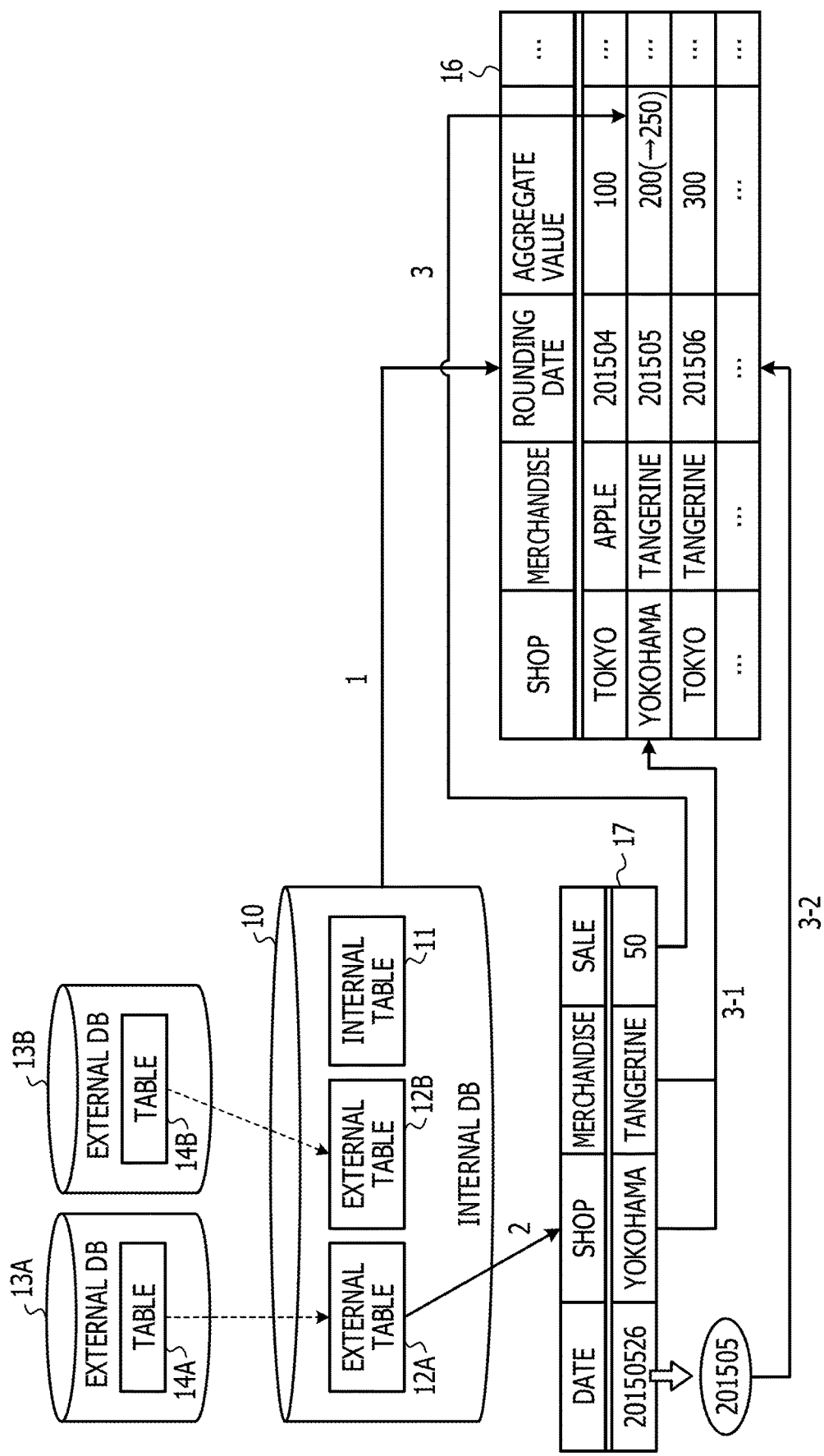
FIG. 1 is a diagram illustrating an aggregation processing of data stored in an external table.

As illustrated in FIG. 1, an internal DB 10 includes an internal table 11 and an external table 12A obtained by a table 14A of an external DB 13A being virtualized into a table of the internal DB 10. The internal DB 10 includes an external table 12B obtained by a table 14B of an external DB 13B being virtualized into a table of the internal DB 10. Dates, shops, merchandise, and sales are stored in the internal table 11 and tables 14A and 14B. Dates are stored in a form of the year, month, and day of the Western calendar in the date, and shop names are stored in the shop, merchandise names are stored in the merchandise, and sale amount is stored in the sales.

Sales of each record stored in the internal table 11 are aggregated (1 in FIG. 1) for each combination of the shop and merchandise and an aggregation table 16 is obtained, for example. The rounding date of the aggregation table 16 is information in which the dates of the internal table 11 are rounded off (day of year, month, and day is removed) by the aggregation unit (here, one-month unit). For example, the aggregate value of sales of "apple" in "April 2015" in a shop named "Tokyo" is 100.

A record 17 is read from the external table 12A (2 in FIG. 1), the sale of the record 17 is added to the aggregate value of the corresponding record of the aggregation table 16 (3 in FIG. 1) such that the aggregation processing of data stored in the external table 12A is performed. In this aggregation processing, it is desirable to search the record in the aggregation table 16 that corresponds to the record 17. In this search processing, when the record corresponding to the record 17 is searched for in the aggregation table 16, the entire records of the aggregation table 16 is searched for the record that coincides with the combination of shop and merchandise of the record 17 (3-1 in FIG. 1).

In this search processing, in addition to searching for a combination of shop and merchandise, a record of the aggregation table 16 in which the rounding date coinciding with the date obtained by the date of the record 17 being rounded by the aggregation unit is stored is searched for (3-2 in FIG. 1). Since respective calculation amount of the search for a combination of shop and merchandise and the search for rounding date exceeds O (1), it takes a relatively long time.

Therefore, in the present embodiment, when the data stored in an external table is aggregated, a specific item to be set as an aggregation unit is used as an index for aggregation so that the aggregation processing is speed up.

Figure 2:
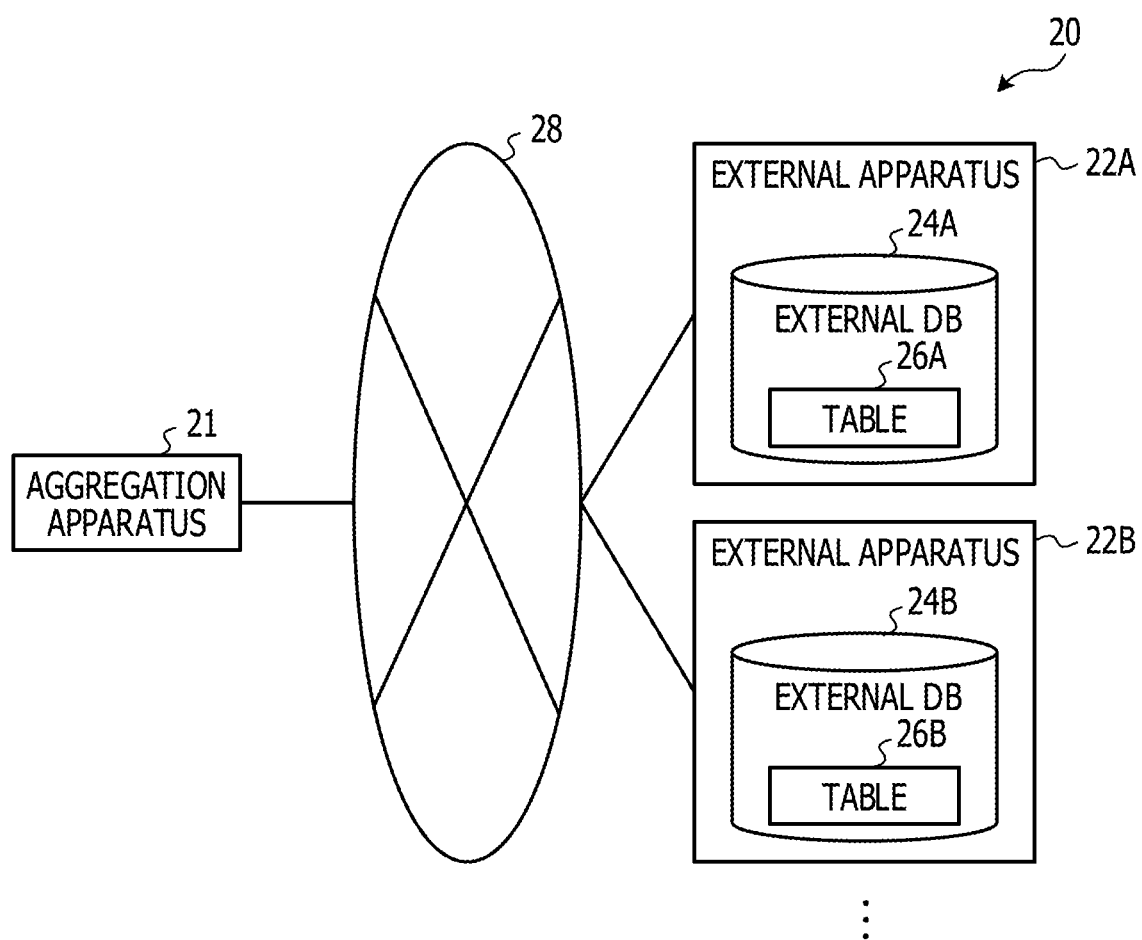
FIG. 2 is a block diagram illustrating a schematic configuration of an aggregation system according to an embodiment.

A configuration of an aggregation system 20 according to the present embodiment will be described with reference to FIG. 2. As illustrated in FIG. 2, the aggregation system 20 includes an aggregation apparatus 21 and external aggregation apparatuses 22A and 22B. An example of the aggregation apparatus 21 and the external apparatuses 22A and 22B is a server computer.

The external DB 24A is stored in a predetermined storage area of the external apparatus 22A. The external DB 24A includes a table 26A in which data to be aggregated by the aggregation apparatus 21 is stored. The external DB 24B is stored in a predetermined storage area of the external apparatus 22B. The external DB 24B includes a table 26B in which data to be aggregated by the aggregation apparatus 21 is stored. Each of the aggregation apparatus 21 and the external apparatuses 22A and 22B is connected to a network 28 and may transmit and receive data to and from each other.

Figure 3:
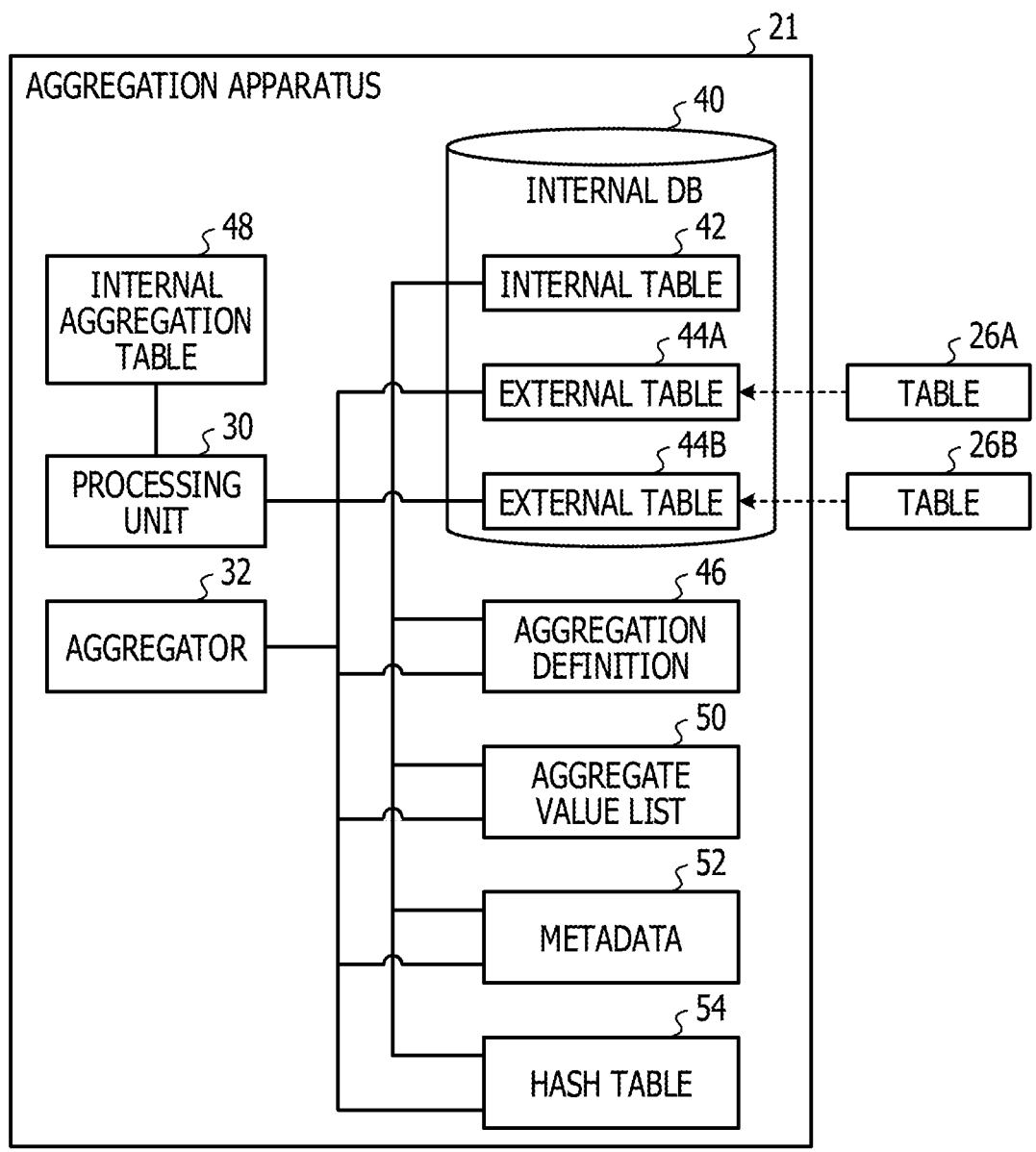
FIG. 3 is a functional block diagram of an aggregation apparatus according to the embodiment.

A functional configuration of the aggregation apparatus 21 according to the present embodiment will be described with reference to FIG. 3. The aggregation apparatus 21 includes a processing unit 30 and an aggregator 32. An internal DB 40, an aggregation definition 46, an internal aggregation table 48, an aggregate value list 50, metadata 52, and a hash table 54 are stored in a predetermined storage area of the aggregation apparatus 21. The internal DB 40 includes an internal table 42 and external tables 44A and 44B.

FIG. 4 illustrates an example of the internal table 42. As illustrated in FIG. 4, sale dates, sale shops, sale merchandise, and sale amount are stored in the internal table 42. An eight digit numerical string indicating year, month, and day is stored in the sale date as an item indicating the date when the merchandise is sold. Information indicating the shop where the merchandise is sold is stored in the sale shop, and information indicating the merchandise sold is stored in the sale merchandise. The total value of sale amount recorded for the merchandise indicated by the information stored in the sale merchandise in the sale shop indicated by the information stored in the sale shop on the date indicated by the numerical string stored in the sale date is stored in the sale amount.

The entity of data of the internal table 42 is stored in a table area of the internal DB 40. An index is created by a function of a system such as Relational DataBase Management System (RDBMS) that manages an internal DB for each item of the sale date, the sale shop, and the sale merchandise of the internal table 42. Hereinafter, to avoid a complication, the index created by the function of the system that manages the internal DB 40 is referred to as "DB index".

FIG. 5 illustrated an example of the external table 44A. As illustrated in FIG. 5, date, shop, merchandise, and sale are stored in the external table 44A. The same information as the sale date of the internal table 42 is stored in the date, and the same information as the sale shop of the internal table 42 is stored in the shop. The same information as the sale merchandise of the internal table 42 is stored in the merchandise, and the same information as the sale amount of the internal table 42 is stored in the sale.

The external table 44A is a table obtained by the table 26A of the external DB 24A being virtualized into a table of the internal DB 40. The entity of the data of the external table 44A is stored in a predetermined storage area of the aggregation apparatus 21 other than the storage area in which the internal DB 40 is stored or in a predetermined storage area of the external apparatus 22A, or the like in a general-purpose data format. Therefore, a DB index is not created in each item of the external table 44A.

The external table 44B is the same table as the external table 44A and stores the same information as the external table 44A except that the external table 44B is a table obtained by the table 26B of the external DB 24B being virtualized into a table of the internal DB 40. The letters at the end of the reference numerals are omitted when the external tables 44A and 44B are collectively referred to without discrimination.

A parameter name used for aggregation of data and a value corresponding to the parameter name are stored in the aggregation definition 46. FIG. 6 illustrates an example of the aggregation definition 46. As illustrated in FIG. 6, an aggregation target table, dimension columns 1 to N, a major, date column are stored as parameters for each table to be aggregated in the aggregation definition 46. In the aggregation definition 46, a date aggregation unit and an aggregation method are stored as parameters common to the tables to be aggregated.

A table name of the table to be aggregated is stored in the aggregation target table. The example of FIG. 6 indicates that the table name of the internal table 42 is "sales_inner", and the table name of the external table 44A is "salesA_outer". In this way, it is possible to determine whether a table is an internal table or an external table by a character string at the end of the table name in the present embodiment. A table of which the end of the table name is "_inner" may be determined to be an internal table and a table of which the end of the table name is "_outer" may be determined to be an external table in the present embodiment.

Column names of items to be set as aggregation units (aggregation group, for example) other than date column to be described later are stored in the dimension columns 1 to N. The number of the dimension columns (the value of N, for example) is not particularly limited as long as it is a predetermined number equal to or larger than the number of items (two in the present embodiment) other than the date column to be set as an aggregation unit.

Column names of the items of which aggregate value is to be calculated are stored in the major. The column names of the items indicating dates are stored in the date column. The granularity at the time of rounding the date is stored in the date aggregation unit as the information to be a date aggregation unit, and a calculation method of the aggregate value of the items stored in the major is stored in the aggregation method. The major is not limited to the column names of the items of which the aggregate value is to be calculated, and may be an equation such as sale unit price×sale quantity, for example. The date aggregation unit is not limited to a one-month unit and may be another unit other than the one-month unit such as a unit of a plurality of months or one year. The aggregation method is not limited to a total (SUM) and may be another method such as an average.

In the example of FIG. 6, the total value of "sale amount" per month is calculated into an aggregate value for each combination of "sale shop" and "sale merchandise" for the internal table 42. The total value of "sale" per month is calculated into an aggregate value for each combination of "shop" and "merchandise" for the external table 44.

The processing unit 30 calculates aggregate value of the internal table 42 in a unit of date item of predetermined granularity for each specific item other than the sale date. In the present embodiment, the processing unit 30 aggregates "sale amount" per month for each combination of "sale shop" and "sale merchandise" for the internal table 42 according to the aggregation definition 46 and generates the internal aggregation table 48. FIG. 7 illustrates an example of the internal aggregation table 48. As illustrated in FIG. 7, the rounding date, dim1, dim2, aggregate value and population parameter are stored in the internal aggregation table 48.

A value into which the "sale date" of the internal table 42 is rounded (day is removed, for example) by "date aggregation unit" of the aggregation definition 46 is stored in the rounding date. Value of each item of "dimension column 1" and "dimension column 2" of the aggregation definition 46 corresponding to the internal table 42 is stored in each of the dim1 and dim2. The total value obtained by the "accumulation of the sales amount" of the internal table 42 in a unit of rounding date for each combination of dim1 and dim2 is stored in the aggregate value. The population parameter of the record used in the calculation of the aggregate value is stored in the population parameter.

The example of FIG. 7 indicates that the sale date is from 20150501 through 20150531, that sale shop is Tokyo, that the record of sale merchandise, apple, is 10, and that the total value of the sale amount of this record is 500 in the internal table 42. Since the generation processing of the internal aggregation table 48 by the processing unit 30 may be performed with Structured Query Language (SQL) such as a SELECT statement on the internal table 42, a detailed description thereof is omitted.

After generating the internal aggregation table 48, the processing unit 30 generates an aggregate value list 50 in which the aggregate value by the date item unit of predetermined granularity is stored for each of the specific items. In the present embodiment, the processing unit 30 stores the aggregate value and the population parameter in the aggregate value list 50 in an ascending order of rounding date for each combination of dim1 and dim2.

The processing unit 30 generates the common metadata 52 with the entire aggregate value lists 50. In the present embodiment, the processing unit 30 stores the minimum value of the rounding date (referred to as "minimum rounding date" hereinafter) and the maximum value of the rounding date (referred to as "maximum rounding date" hereinafter) of the data to be aggregated in the metadata 52 respectively. In the present embodiment, at the time of generating each aggregate value list 50, when the maximum value and the minimum value of the rounding date of each aggregate value list 50 are different or when the rounding dates are not continuous, the processing unit 30 inserts a record with aggregate value and population parameter being zero. In this way, when generating each aggregate value list 50, the processing unit 30 generates each aggregate value list 50 such that the minimum rounding date, the maximum rounding date, and the record value are the same.

Figure 8:
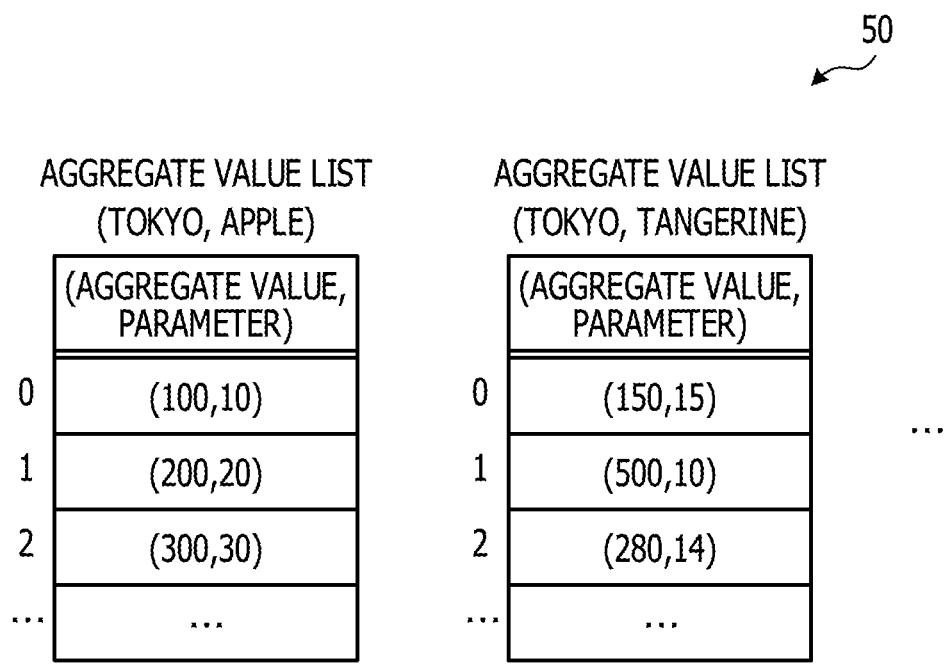
FIG. 8 is a diagram illustrating an example of an aggregate value list.

FIG. 8 illustrates an example of the aggregate value list 50, and FIG. 9 illustrates an example of the metadata 52. The examples of FIGS. 8 and 9 indicate that the aggregate value of the sales amount of apple in May, 2015 at the Tokyo shop is 100 and that the record number used in the calculation of the aggregate value is ten, for example. As illustrated in FIG. 8, in the present embodiment, the aggregate value list 50 is stored in a form of an array.

Using the specific item as an index, the processing unit 30 performs processing of associating the specific item with the aggregate value list 50 on a one-to-one basis so that the aggregate value list 50 of the specific item may be specified. In the present embodiment, when dim1 and dim2 are input, the processing unit 30 uses a hash function that outputs a different value for each combination of dim1 and dim2 and associates dim1 and dim2 with the aggregate value list 50 on a one-to-one basis. The processing unit 30 generates a hash table 54 in which a hash value obtained from the hash function for each combination of dim1 and dim2 is used as an address of the storage area pointing to each element of the table. The processing unit 30 stores in each element of the hash table 54 a head address of the storage area of the aggregate value list 50 of the combination of dim1 and dim2 corresponding to each element.

Figure 10:
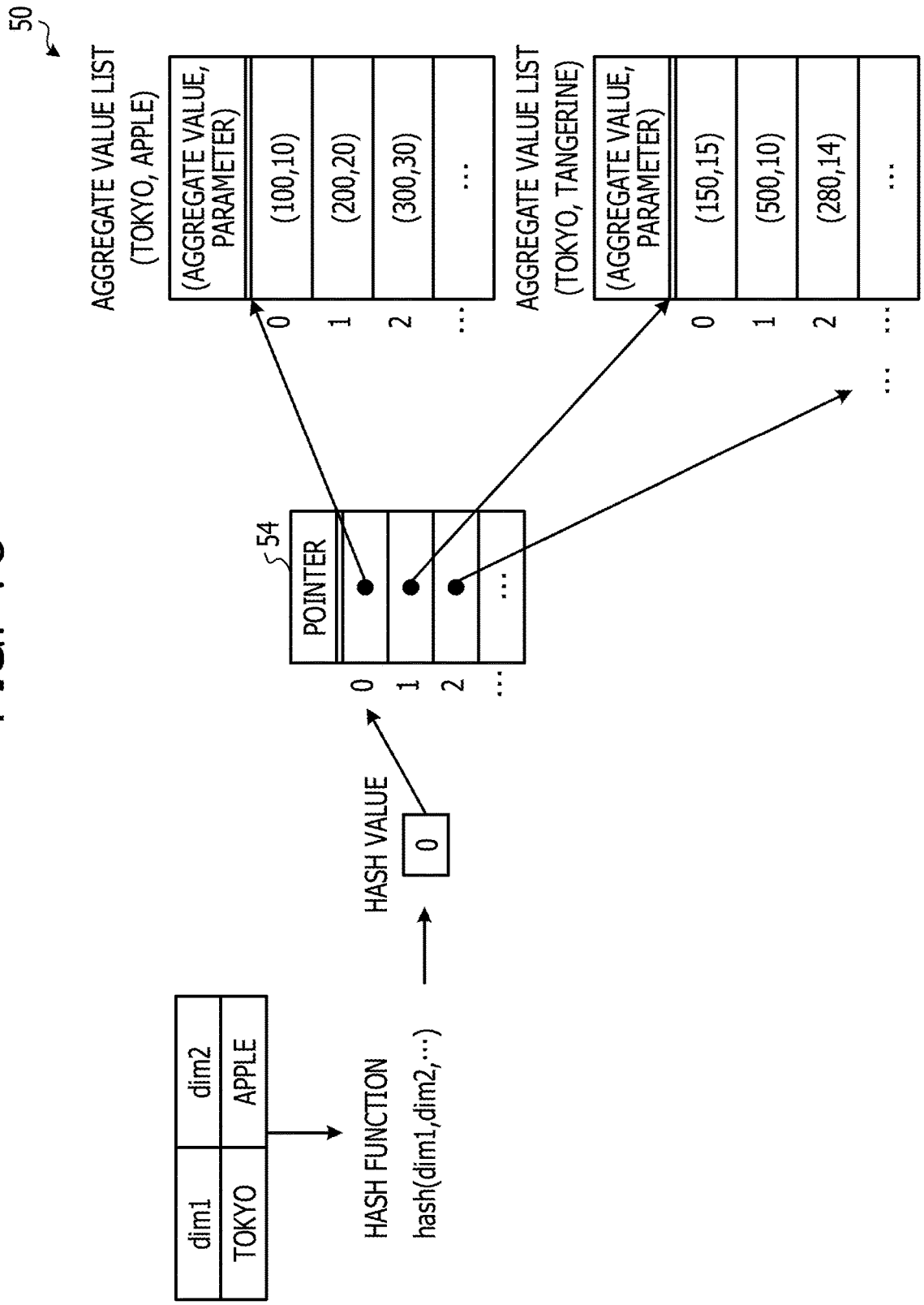
FIG. 10 is a diagram illustrating an example of a hash table.

FIG. 10 illustrates an example of the hash table 54. As illustrated in FIG. 10, the head address of each aggregate value list 50 is stored in the form of an array in the hash table 54. Each element of the hash table 54 may be accessed with the hash value corresponding to each element as an index. Therefore, in the present embodiment, the aggregate value list corresponding to this combination may be specified by the calculation amount of O (1) from the hash value obtained by the combination of dim1 and dim2 being input into the hash function. The index of the hash table 54 is referred to as "hash index" in the following.

When the data stored in the external table 44 is aggregated, using the above specific item as an index, the aggregator 32 according to the present embodiment updates the aggregate value of the aggregate value list 50. When the aggregate value is updated, the aggregator 32 uses a function specifying the date item of each predetermined granularity in the aggregate value list and specifies the aggregate value to be updated.

Figure 11:
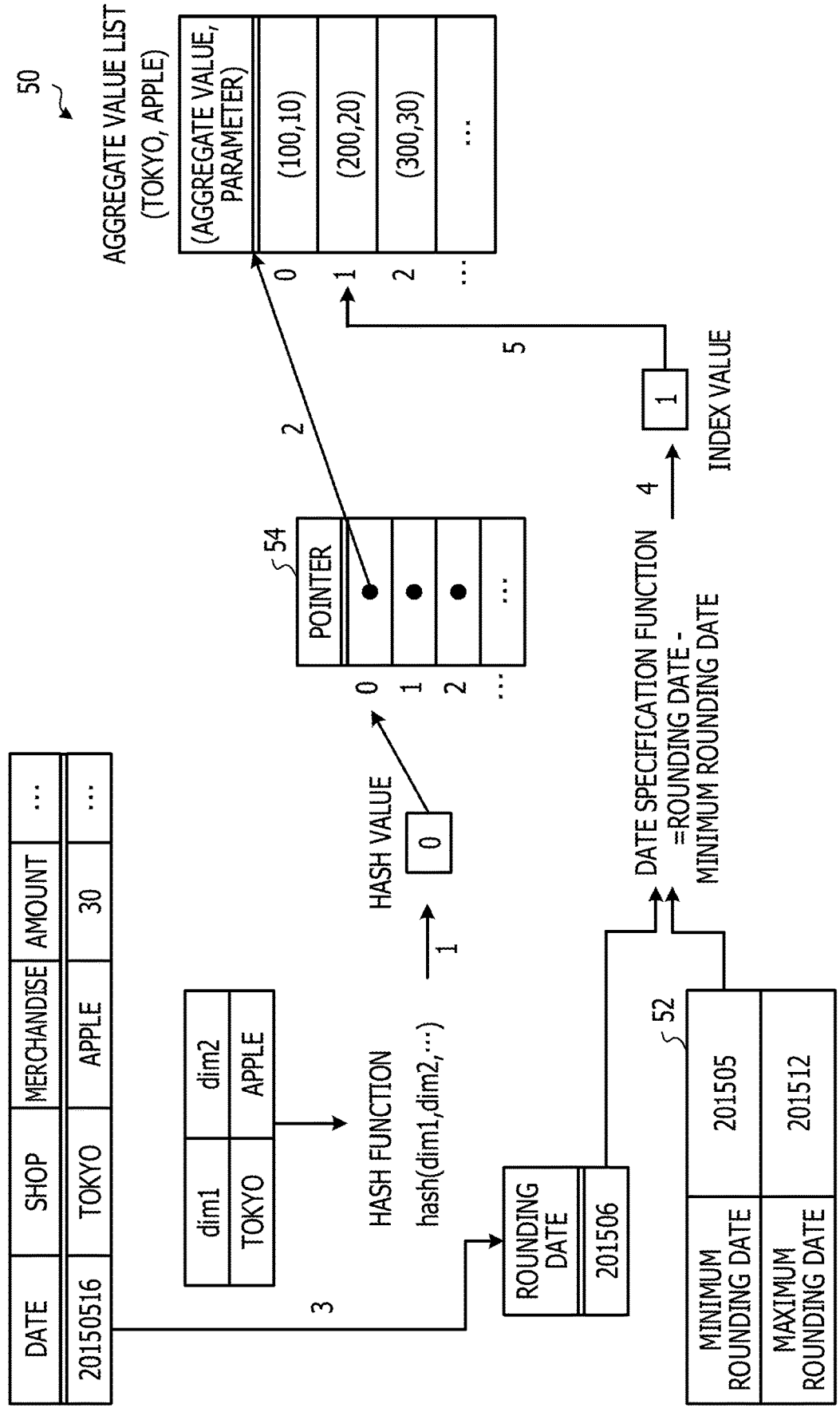
FIG. 11 is a diagram illustrating specific processing of an aggregation target record.

As illustrated in FIG. 11 as an example, in the present embodiment, the aggregator 32 sequentially reads record one by one from the external table 44 in accordance with the value of the aggregation target table of the aggregation definition 46. The aggregator 32 inputs the shop and merchandise of the read record into the hash function and obtains hash value (1 in FIG. 11) in accordance with the values of the dimension columns 1 to N of the aggregation definition 46. Using the obtained hash value as a hash index, the aggregator 32 reads the element of the hash table 54 corresponding to the combination of shop and merchandise of the read record. In this way, the aggregator 32 specifies the head address of the aggregate value list 50 corresponding to the combination (2 in FIG. 11).

On the other hand, the aggregator 32 calculates the rounding date by rounding the date of the read record in accordance with the date aggregation unit of the aggregation definition 46 (3 in FIG. 11). The aggregator 32 reads the minimum rounding date from the metadata 52. The aggregator 32 inputs the calculated rounding date and read minimum rounding date into the date specification function that specifies the rounding date to be calculated of the aggregate value of the aggregate value list 50. The aggregator 32 obtains the output value of the date specification function as an index for accessing the element of the aggregate value list 50 (4 in FIG. 11).

In the present embodiment, a function that outputs a value obtained by the input minimum rounding date being subtracted from the input rounding date is applied as a date specification function. In the present embodiment, the aggregate value list 50 is stored in a form of an array, and the aggregate value and the population parameter are stored in the aggregate value list 50 in an ascending order of the rounding date such that the element to be calculated of the aggregate value in the aggregate value list 50 may be accessed by using the date specification function.

The aggregator 32 adds the sale of the read record to the aggregate value stored in the element specified by using the date specification function in the aggregate value list 50 specified by using the hash index and adds one to the population parameter (5 in FIG. 11)

For example, when the aggregate value and the population parameter are stored in the aggregate value list 50 in descending order of the rounding date, a function that outputs a value obtained by subtraction of the input rounding date from the input maximum rounding date may be applied as a date specification function.

Figure 12:
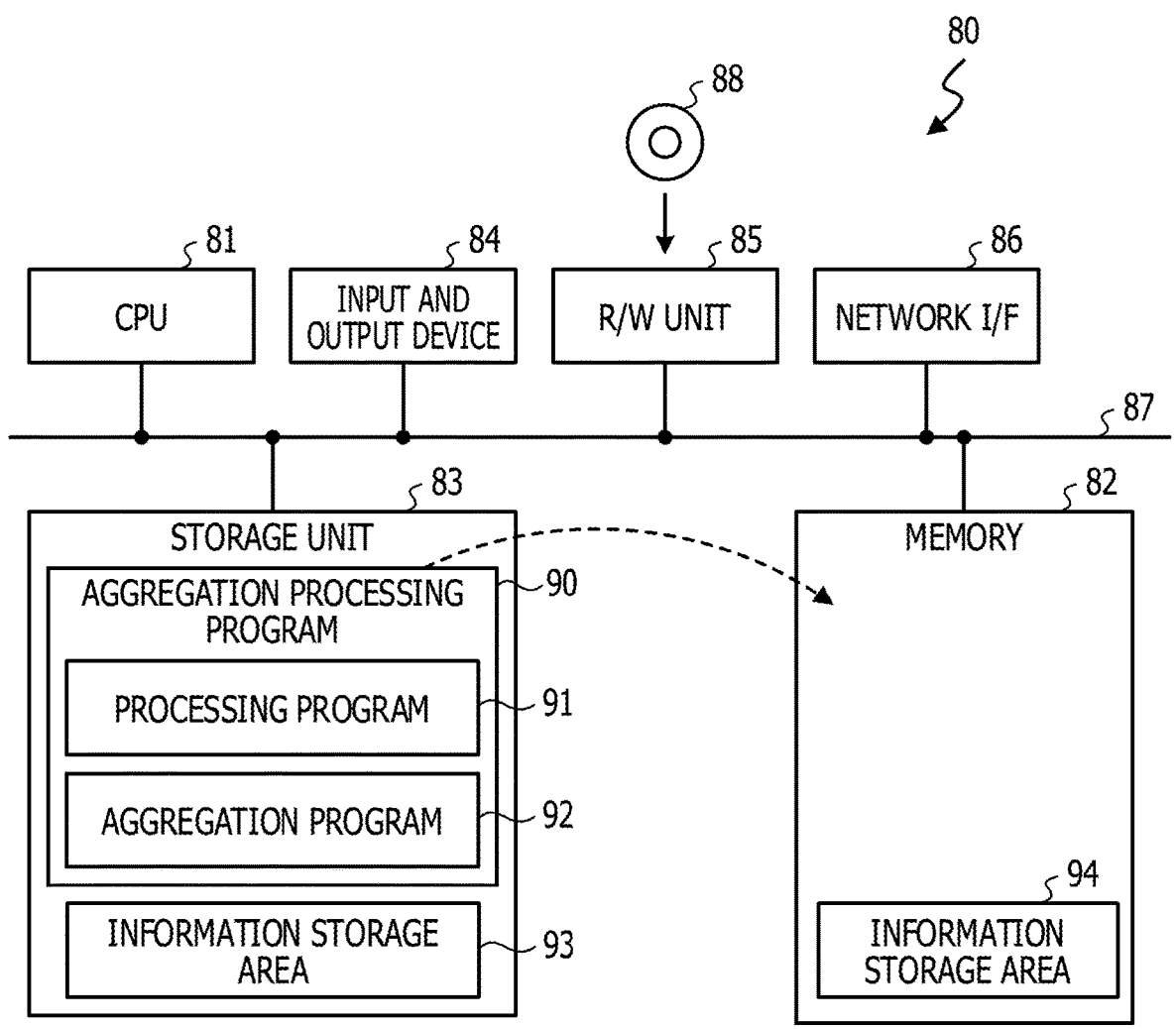
FIG. 12 is a block diagram illustrating a schematic configuration of a computer functioning as an aggregation apparatus according to the embodiment.

The aggregation apparatus 21 may be realized by a computer 80 illustrated in FIG. 12, for example. The computer 80 includes a central processing unit (CPU) 81, a memory 82 as a temporary storage area, and a nonvolatile storage unit 83. The computer 80 includes an input and output device 84 such as a display device and an input device. The computer 80 includes a Read/Write (R/W) unit 85 that controls reading and writing of data from and into a recording medium 88 and a network I/F 86 to be connected to a network. The CPU 81, the memory 82, the storage unit 83, the input and output device 84, the R/W unit 85, and the network I/F 86 are connected to each other through a bus 87.

The storage unit 83 may be realized by a Hard Disk Drive (HDD), a Solid State Drive (SSD), a flash memory, and the like. An aggregation processing program 90 that causes the computer 80 to function as the aggregation apparatus 21 is stored in the storage unit 83 as a storage medium. The aggregation processing program 90 has a processing process 91 and an aggregation process 92. The storage unit 83 has an information storage area 93 in which the internal DB 40 and the aggregation definition 46 are stored. The memory 82 has an information storage area 94 in which an internal aggregation table 48, the aggregate value list 50, the metadata 52, and the hash table 54 are stored. The internal aggregation table 48, the aggregate value list 50, the metadata 52, and the hash table 54 may be stored in the internal DB 40 or may be stored in a storage area different from the internal DB 40 of the storage unit 83.

The CPU 81 reads the aggregation processing program 90 from the storage unit 83, loads the program in the memory 82, and executes the process included in the aggregation processing program 90. By executing the processing process 91, the CPU 81 operates as the processing unit 30 illustrated in FIG. 3. By executing the aggregation process 92, the CPU 81 operates as the aggregator 32 illustrated in FIG. 3. In this way, the computer 80 executing the aggregation processing program 90 functions as the aggregation apparatus 21.

The function realized by the aggregation processing program 90 may also be realized by a semiconductor integrated circuit, for example, an application specific integrated circuit (ASIC) or the like.

The operation of the aggregation apparatus 21 according to the present embodiment will be described. The aggregation apparatus 21 executes the aggregation processing illustrated in FIGS. 13A and 13B by executing the aggregation processing program 90. The aggregation processing illustrated in FIGS. 13A and 13B start to get executed by the CPU 81 when an instruction to start execution is input by a user or at a fixed timing once a day, for example.

Figure 13A:
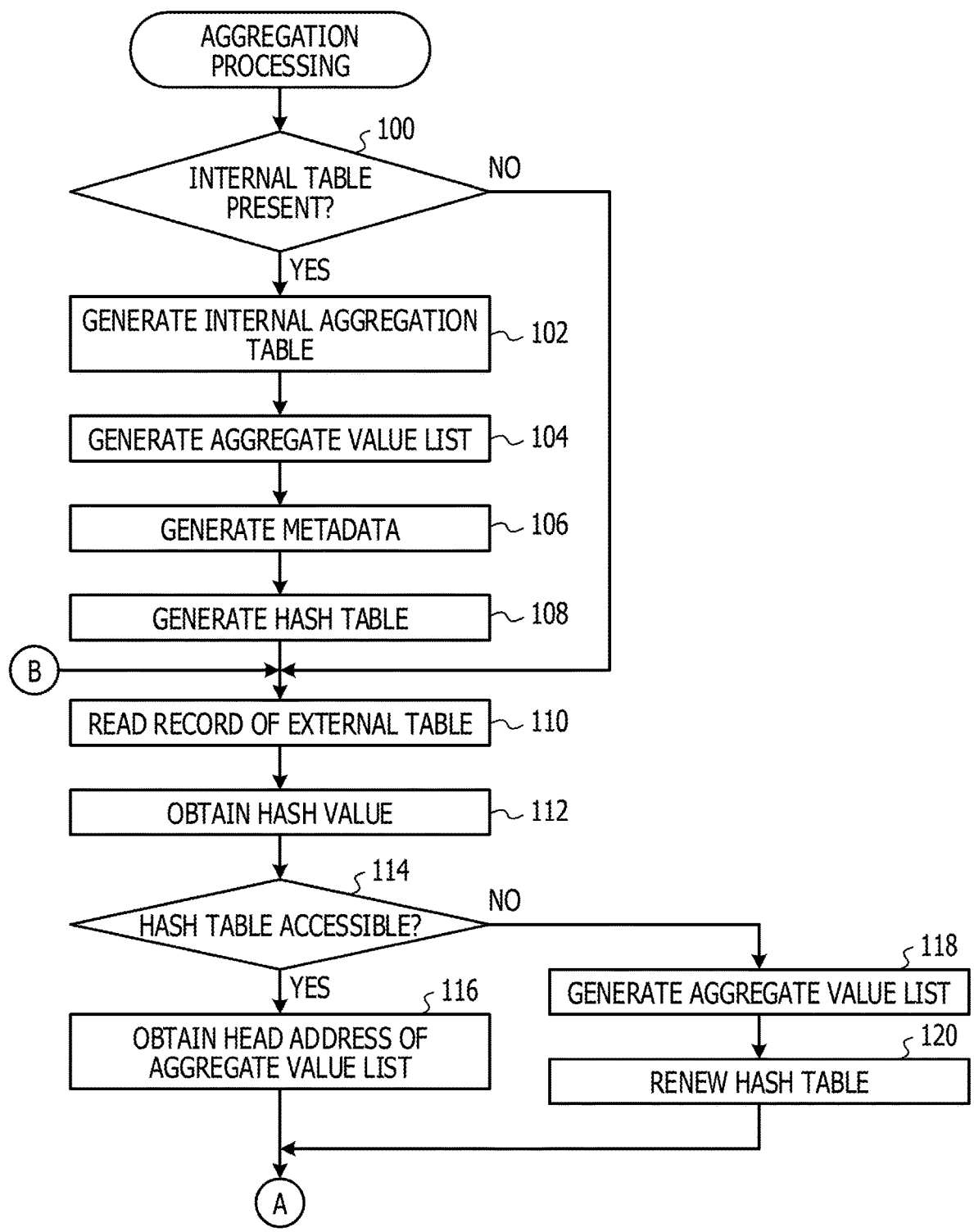
FIGS. 13A and 13B are flowcharts illustrating an example of aggregation processing according to the embodiment.

In step 100 of the aggregation processing illustrated in FIG. 13A, the processing unit 30 determines whether or not a table that ends with "_inner" is present in an aggregation target table of the aggregation definition 46 stored in the storage unit 83. In this way, the processing unit 30 determines whether or not the internal table 42 is present in the table to be aggregated. When the determination is affirmative, the processing proceeds to step 102, and when the determination is negative, the processing proceeds to step 110.

In step 102, as described above, the processing unit 30 aggregates the data stored in the internal table 42 in accordance with the aggregation definition 46, and generates the internal aggregation table 48. In the next step 104, the processing unit 30 generates the aggregate value list 50 for each combination of dim1 and dim2 of the internal aggregation table 48 generated in step 102. The processing unit 30 stores the corresponding aggregate value and population parameter of the internal aggregation table 48 in each aggregate value list 50 in an ascending order of the rounding date of the internal aggregation table 48.

In the next step 106, the processing unit 30 generates the metadata 52 in which the minimum value and the maximum value of the rounding date of the internal aggregation table 48 generated in step 102 is stored. In the next step 108, as described above, the processing unit 30 generates the hash table 54 with the hash value obtained by the hash function being used as the address of the storage area pointing to each element of the table for each combination of dim1 and dim2. The processing unit 30 stores, in each element of the hash table 54, the head address of the storage area of the aggregate value list 50 of the combination of dim1 and dim2 corresponding to each element.

The processing from step 110 to step 138 illustrated below is executed for each external table 44 included in the aggregation definition 46 as a processing target. When the aggregation apparatus 21 executes the processing from step 110 to step 138 repeatedly, the external table 44 that has not been a processing target thus far is taken as a processing target. Each record stored in the external table 44 to be processed is read one by one sequentially from the top and the processing from step 110 to step 136 illustrated below is repeatedly executed.

The aggregator 32 reads one record from the external table 44 in step 110. In the next step 112 the aggregator 32 inputs the shop and merchandise of the record read in step 110 into the hash function in accordance with the aggregation definition 46 and obtains the hash value output from the hash function.

In the next step 114, using the hash value obtained in step 112 as a hash index, the aggregator 32 determines whether or not the element of the hash table 54 generated in step 108 may be accessed. When the determination is affirmative, processing proceeds to step 116, and when the determination is negative, processing proceeds to step 118.

In step 116, using the hash value obtained in step 112 as the hash index, the aggregator 32 obtains the element of the hash table 54 generated in step 108. In this way, the aggregator 32 obtains the head address of the storage area of the aggregate value list 50 corresponding to the combination of the shop and the merchandise of the record read in step 110.

On the other hand, in step 118, the processing unit 30 generates the aggregate value list 50 in which record is stored with the sales of the record read in step 110 as an aggregate value and the population parameter as one. When the metadata 52 is not present in the first execution of this step 118, the processing unit 30 generates the metadata 52 with the minimum rounding date and the maximum rounding date as the rounding date obtained by rounding the date of the record read in step 110. In the next step 120, the processing unit 30 stores the head address of the storage area of the aggregate value list 50 generated in step 118 in the element of the hash table 54 accessible with the hash value obtained in step 112 and thereby updates the hash table 54.

Figure 13B:
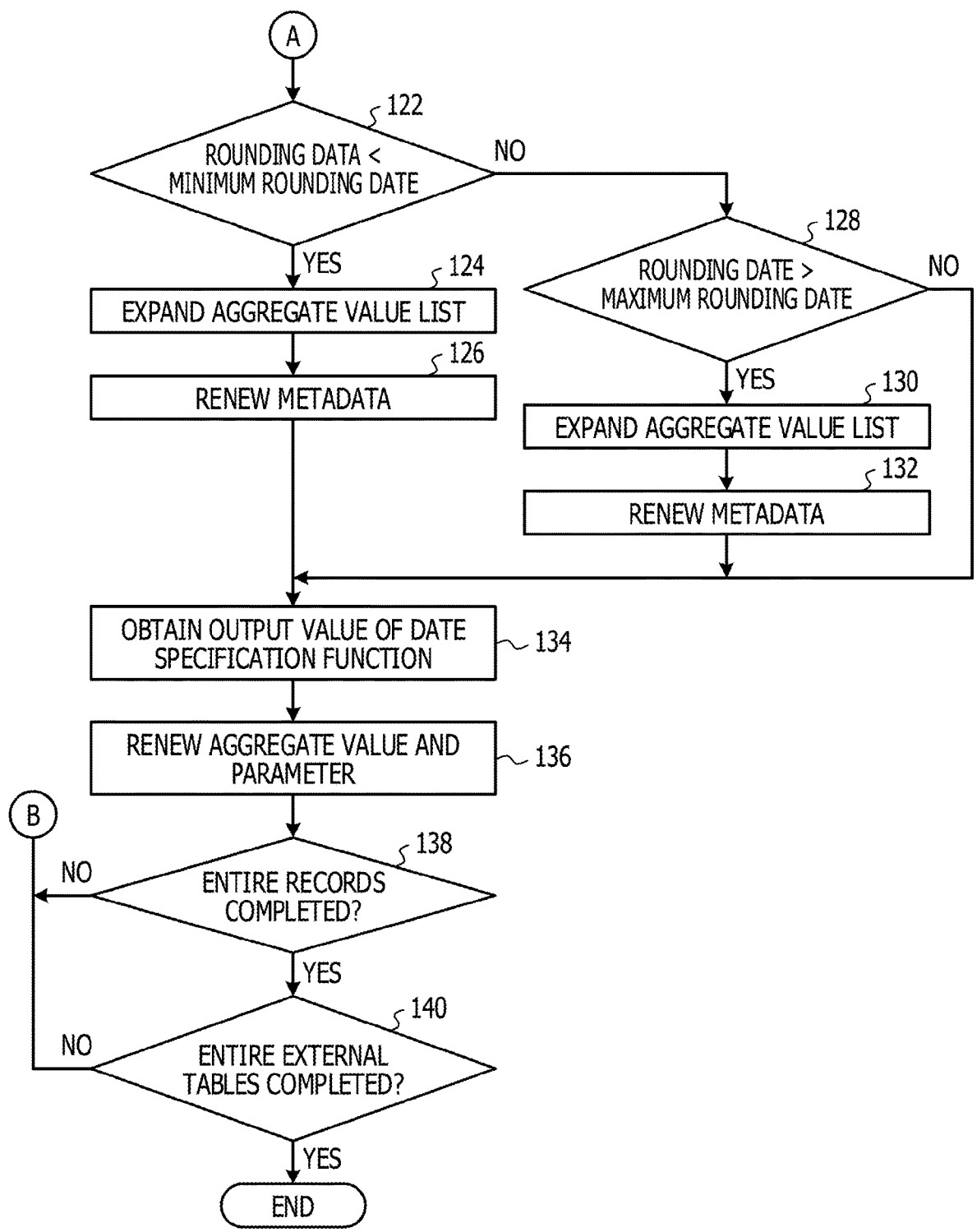

In step 122 of the aggregation processing illustrated in FIG. 13B, the aggregator 32 calculates rounding date by rounding the date of the record read in step 110 by the date aggregation unit of the aggregation definition 46. The aggregator 32 determines whether or not the calculated rounding date is smaller than the minimum rounding date of the metadata 52. When the determination is affirmative, processing proceeds to step 124, and when the determination is negative, processing proceeds to step 128.

Figure 14:
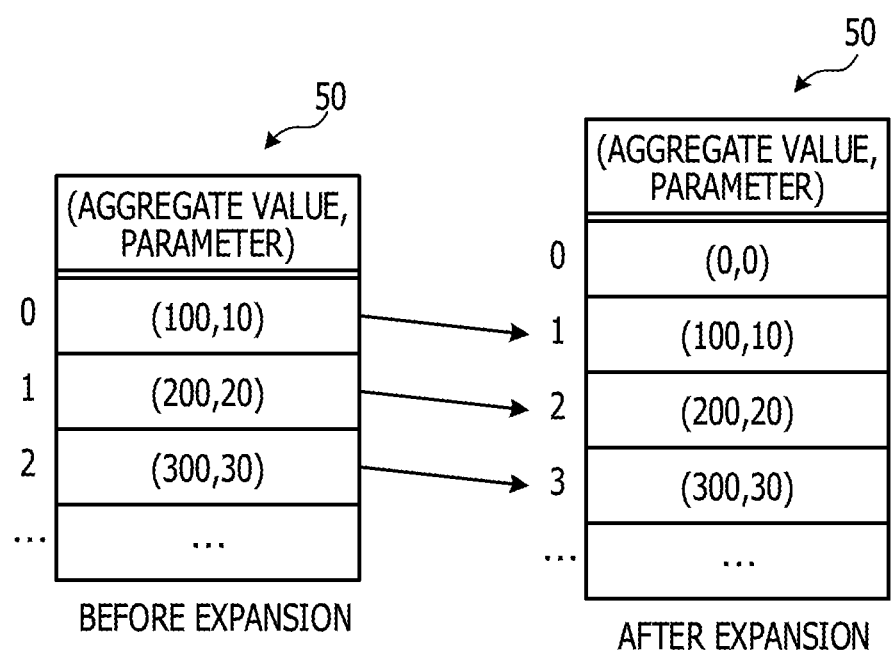
FIG. 14 is a diagram illustrating an example of an expansion processing of the aggregate value list.

In step 124, the aggregator 32 expands each aggregate value list 50. For example, the aggregator 32 inserts as many records, in which the aggregate value and the population parameter are set to zero respectively, as the number of difference between the minimum rounding date and the rounding date from the head of the aggregate value list 50 down. As illustrated in FIG. 14, for example, when the aggregate value and the population parameter of May 2015 through December 2015 are stored in the aggregate value list 50 in ascending order and the rounding date calculated in step 122 is "201504", the aggregator 32 expands the aggregate value list 50 by the following processing. For example, in this case, the processing unit 30 inserts one record in which the aggregate value and the population parameter are set to zero at the head of the aggregate value list 50.

In the next step 126, the aggregator 32 updates the minimum rounding date of the metadata 52 with the rounding date calculated in step 122.

On the other hand, the aggregator 32 determines whether or not the rounding date calculated in step 122 is larger than the maximum rounding date of the metadata 52 in step 128. When the determination is affirmative, processing proceeds to step 130, and when the determination is negative, processing proceeds to step 134.

Figure 15:
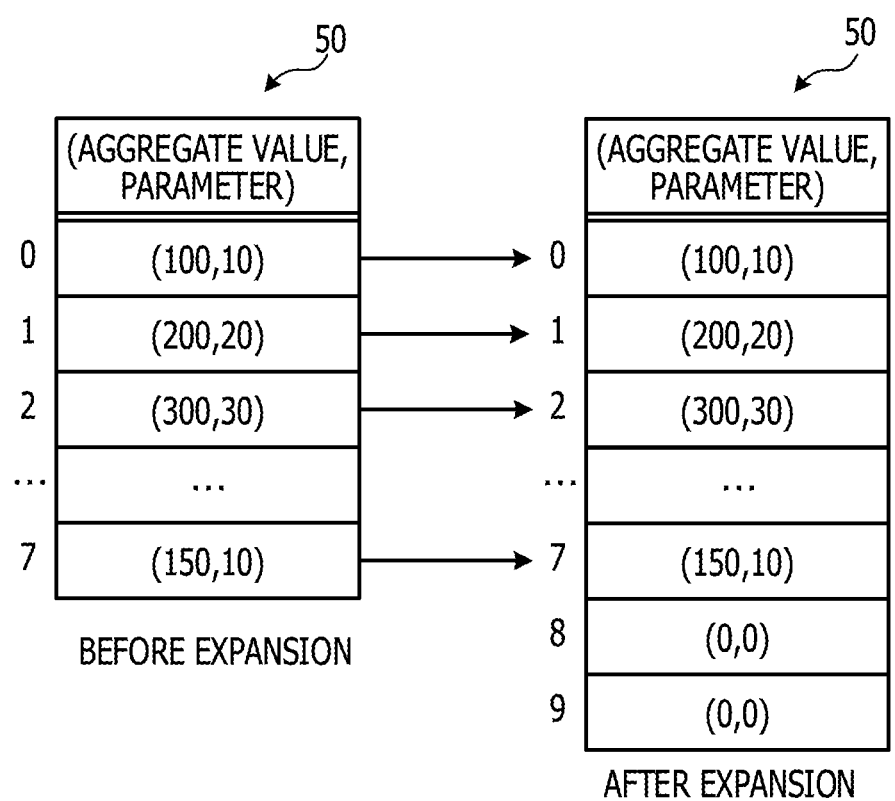
FIG. 15 is a diagram illustrating an example of an expansion processing of the aggregate value list.

In step 130, the aggregator 32 expands each aggregate value list 50. For example, the aggregator 32 inserts as many records, in which the aggregate value and the population parameters are set to zero, as the number of difference between the rounding date and the maximum rounding date at the end of the aggregate value list 50. As illustrated in FIG. 15, for example, when the aggregate value and the population parameter of May 2015 through December 2015 is stored in the aggregate value list 50 in ascending order and the rounding date calculated in step 122 is "201602", the aggregator 32 expands the aggregate value list 50 by the following processing. For example, in this case, the processing unit 30 inserts two records in which the aggregate values and the population parameters are set to zero at the end of the aggregate value list 50.

In the next step 132, the aggregator 32 updates the maximum rounding date of the metadata 52 with the rounding date calculated in step 122.

In step 134, the aggregator 32 inputs the rounding date calculated in step 122 and the minimum rounding date of the metadata 52 into the date specification function described above and obtains the output value of the date specification function. In the next step 136, using the hash value obtained in step 112 as a hash index, the aggregator 32 specifies the aggregate value list 50 to be updated of the aggregate value. Using the output value of the date specification function, the aggregator 32 specifies the element to be updated of the aggregate value of the specified aggregate value list 50. The aggregator 32 adds the sales of the record read in step 110 to the aggregate value stored in the specified element and add one to the population parameter.

In step 138, the aggregator 32 determines whether or not the processing from step 110 through step 136 has been executed for the entire records of the external table 44 to be processed. When the determination is negative, processing proceeds to step 110, and when the determination is affirmative, processing proceeds to step 140.

In step 140, the aggregator 32 determines whether or not the processing from step 110 through step 138 has been executed for the entire external tables 44 to be included in the aggregation definition 46. When the determination is affirmative, processing returns to step 110, and when the determination is negative, the aggregation processing ends.

The aggregate value list 50 obtained by the above aggregation processing is used in a data analysis such as a time-series analysis, for example.

As described above, according to the present embodiment, the specific items (shop and merchandise, for example) other than the date item (date, for example) as an aggregation unit and the aggregate value list 50 in which aggregate value is stored in a unit of date item of a predetermined granularity (for example, monthly basis) for each specific item are associated with each other on a one-to-one basis. When the data stored in the external table 44 is aggregated, the specific item is used as an index so as to update the aggregate value of the aggregate value list 50. In this way, the data stored in the external table 44 may be aggregated at a high speed.

According to the present embodiment, for the data stored in the internal table 42, after the aggregate value is calculated by the date item unit of a predetermined granularity for each specific item, the specific item and the aggregate value list 50 are associated with each other on a one-to-one basis. Therefore, after the aggregate value list 50 is generated with the internal table 42 that may be aggregated at a relatively high speed with the DB index, the data stored in the external table 44 is aggregated. In this way, the data stored in the external table 44 may be aggregated at a relatively high speed, compared with a case where the data stored in the external table 44 is aggregated prior to the data stored in the internal table 42.

According to the present embodiment, when a specific item is input, a hash function that outputs a value different for each specific item is used and the specific item and the aggregate value list 50 are associated with each on a one-to-one basis. In this way, the calculation amount of processing f specifying the aggregate value list 50 may be reduced, and as a result, the data stored in the external table 44 may be aggregated at a high speed.

According to the present embodiment, the aggregate value is stored in the order of date item (ascending order, for example) in the aggregate value list 50. According to the present embodiment, when the aggregate value of the aggregate value list 50 is updated with the specific item as an index, the date specification function that specifies the date item of each predetermined granularity in the aggregate value list 50 is used so as to update the aggregate value. In this way, the calculation amount of processing of specifying the element to be updated of the aggregate value of the aggregate value list 50 may be reduced, and as a result, the data stored in the external table 44 may be aggregated at a high speed.

In the embodiment, a case where the internal table 42 and the external table 44 are applied as a table to be aggregated is described, but the present embodiment is not limited thereto. For example, only the external table 44 may be applied as a table to be aggregated.

According to the above embodiment, a case where a hash function and the hash table 54 are used to specify the aggregate value list 50 corresponding to a combination of shop and merchandise is described, but the present embodiment is not limited thereto. For example, a list file that associates shop and merchandise with the corresponding storage area of the aggregate value list 50 on a one-to-one basis may be used to specify the aggregate value list 50 corresponding to a combination of shop and merchandise.

In the embodiment, a case where one hash table 54 is generated for a combination of items to be set as aggregation units is described, but the present embodiment is not limited thereto. For example, a hash table 54 may be generated for each item to be set as an aggregation unit. An example of the hash table 54 in this embodiment is illustrated in FIG. 16.

Figure 16:
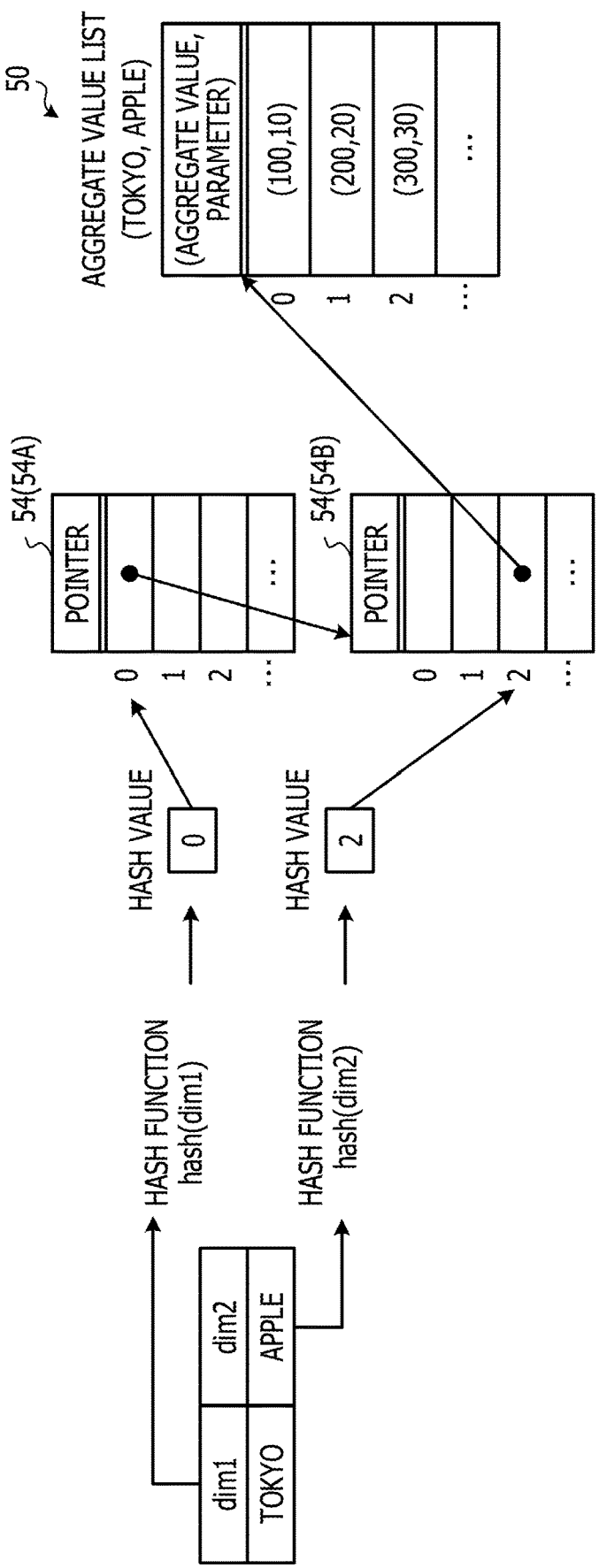
FIG. 16 is a diagram illustrating an example of a hash table according to a modification example.

In the example of FIG. 16, the head address of the storage area of the next hash table 54 is stored in the elements of hash table 54 from one to N−1 (here, N=2). The head address of the storage area of the aggregate value list 50 corresponding to a combination of items to be set as aggregation units is stored in the Nth hash table 54.

In this case, for example, using the output value of a hash function into which dim1 is input, the aggregator 32 obtains the address stored in the element corresponding to dim1 of the hash table 54A. Using the output value of a hash function into which dim2 is input, the aggregator 32 obtains the address stored in the element of the hash table 54B specified with the obtained address. Using the obtained address, the aggregator 32 specifies the aggregate value list 50 corresponding to a combination of dim1 and dim2. In this embodiment, although the calculation amount of the specification processing of the aggregate value list 50 increases, creation and automatic expansion, and the like of the hash table 54 are controlled for each item to be set as an aggregation unit, so that memory resource may be utilized efficiently as compared with the embodiment.

In the embodiment, a case where a combination of two items (shop and merchandise in the embodiment) is applied as specific items other than date item to be set as an aggregation unit is described, but the present embodiment is not limited thereto. One item may be applied as a specific item other than the date item to be set as an aggregation unit, or a combination of three or more items may be applied.

In the above embodiment, an aspect where the aggregation processing program 90 is pre-installed in the storage unit 83 is described, but the present embodiment is not limited thereto. The aggregation processing program 90 may be provided in a form of being recorded in a recording medium such as a CD-ROM, a DVD-ROM, a USB memory, a memory card, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the program aggregating data of an aggregation target table including at least one external tables relating to data other than data managed by the computer, the process comprising:

executing processing of associating a combination of specific items other than a date item as an aggregation unit of the external table with one of aggregate value lists in which an aggregate value is respectively stored in a unit of date item of predetermined granularity on a one-to-one basis such that an aggregate value list corresponding to the combination is specified by using the combination as an index;

acquiring the combination from the external table when data stored in the external table is aggregated;

specifying, from among the aggregate value lists, an aggregate value list corresponding to the acquired combination by using the combination as the index; and updating the aggregate value of the specified aggregate value list, wherein the aggregate value is stored in the aggregate value list in an order of the date item, and the process further comprises specifying the aggregate value to be updated by using a function that specifies the date item of each of the predetermined granularity in the aggregate value list when the aggregate value of the specified aggregate value list is updated;

wherein the process further comprises acquiring a hash value by inputting information of the acquired combination to a hash function, and wherein the specifying includes specifying the aggregate value by accessing the aggregate value list using the acquired hash value as the index.

2. The non-transitory computer-readable storage medium according to claim 1, wherein the aggregation target table has a plurality of items including the date item and includes an internal table relating to the data managed by the computer, and the processing is executed after the aggregate value is calculated in a unit of date item of the predetermined granularity for each of the specific items, with respect to data stored in the internal table.

3. The non-transitory computer-readable storage medium according to claim 1, wherein the executing includes executing processing of associating the specific item with the aggregate value list on a one-to-one basis such that the aggregate value list of the specific item is specified by using a hash value output from a hash function that outputs a different value for each of the specific items as the index when the specific item is input.

4. An aggregation apparatus that aggregates data of aggregation target table including at least one external tables relating to data other than data managed by the aggregation apparatus, the apparatus comprising:

a memory; and a processor coupled to the memory and configured to:

execute processing of associating a combination of specific items other than a date item as an aggregation unit of the external table with one of aggregate value lists in which an aggregate value is respectively stored in a unit of date item of predetermined granularity on a one-to-one basis such that an aggregate value list corresponding to the combination is specified by using the combination as an index, acquire the combination from the external table when data stored in the external table is aggregated, specify, from among the aggregate value lists, an aggregate value list corresponding to the acquired combination by using the combination as the index, and update the aggregate value of the specified aggregate value list, wherein the aggregate value is stored in the aggregate value list in an order of the date item, and the processor is configured to specify the aggregate value to be updated by using a function that specifies the date item of each of the predetermined granularity in the aggregate value list when the aggregate value of the aggregate value list specified by using the specific item as the index is updated, wherein the processor is further configured to acquire a hash value by inputting information of the acquired combination to a hash function, and wherein the processor specifies the aggregate value by accessing the aggregate value list using the acquired hash value as the index.

5. The aggregation apparatus according to claim 4, wherein the aggregation target table has a plurality of items including the date item and includes an internal table relating to data managed by the computer, and the processing is executed after the aggregate value is calculated in a unit of date item of the predetermined granularity for each of the specific items with respect to data stored in the internal table.

6. The aggregation apparatus according to claim 4, wherein the processor is configured to execute processing of associating the specific item with the aggregate value list on a one-to-one basis such that the aggregate value list of the specific item is specified by using a hash value output from a hash function that outputs a different value for each of the specific items as the index when the specific item is input.

7. An aggregation method executed by an aggregation apparatus that aggregates data of an aggregation target table including at least one external tables relating to data other than data managed by the aggregation apparatus, the method comprising:

executing processing of associating a combination of specific items other than a date item as an aggregation unit of the external table with one of aggregate value lists in which an aggregate value is respectively stored in a unit of date item of predetermined granularity on a one-to-one basis such that an aggregate value list corresponding to the combination is specified by using the combination as an index;

acquiring the combination from the external table when data stored in the external table is aggregated;

specifying, from among the aggregate value lists, an aggregate value list corresponding to the acquired combination by using the combination as the index; and updating the aggregate value of the specified aggregate value list, wherein the aggregate value is stored in the aggregate value list in an order of the date item, and the process further comprises specifying the aggregate value to be updated by using a function that specifies the date item of each of the predetermined granularity in the aggregate value list when the aggregate value of the specified aggregate value list is updated;

wherein the process further comprises acquiring a hash value by inputting information of the acquired combination to a hash function, and wherein the specifying includes specifying the aggregate value by accessing the aggregate value list using the acquired hash value as the index.

8. The aggregation method according to claim 7, wherein the aggregation target table has a plurality of items including the date item and includes an internal table relating to data managed by the computer, and the processing is executed after the aggregate value is calculated in a unit of date item of the predetermined granularity for each of the specific items with respect to data stored in the internal table.

9. The aggregation method according to claim 7,
wherein the executing includes executing processing of associating the specific item with the aggregate value list on a one-to-one basis such that the aggregate value list of the specific item is specified by using a hash value output from a hash function that outputs a different value for each of the specific items as the index when the specific item is input.

10. The non-transitory computer-readable storage medium according to claim 1,
wherein the specifying includes specifying a head address of a storage area that stores the specified aggregate value list.

* * * * *